(12) United States Patent
Marini et al.

(10) Patent No.: US 9,019,912 B2
(45) Date of Patent: Apr. 28, 2015

(54) MOBILE TERMINAL SIMULATOR FOR A WIRELESS TELECOMMUNICATIONS NETWORK AND METHOD OF SIMULATING A MOBILE TERMINAL

(75) Inventors: Paolo Marini, Milan (IT); Lodovico Binda, Olgiate Molgora (IT); Enrico Bendinelli, Monza (IT)

(73) Assignee: Prisma Engineering S.R.L., Milan (IT)

( * ) Notice: Subject to any disclaimer, the term of this patent is extended or adjusted under 35 U.S.C. 154(b) by 406 days.

(21) Appl. No.: 13/470,240

(22) Filed: May 11, 2012

(65) Prior Publication Data
US 2012/0287871 A1 Nov. 15, 2012

(30) Foreign Application Priority Data

May 11, 2011 (EP) .................................... 11425130

(51) Int. Cl.
 *H04W 24/00* (2009.01)
 *H04W 24/06* (2009.01)
(52) U.S. Cl.
 CPC .................................... *H04W 24/06* (2013.01)
(58) Field of Classification Search
 CPC ....... H04W 4/00; H04W 24/00; H04W 4/003; H04W 24/02; H04W 24/06; H04B 17/00; H04B 17/0002; H04B 17/0017; H04B 17/003
 USPC .......... 370/329, 336, 252, 401; 455/423–424, 455/67.14
See application file for complete search history.

(56) References Cited

U.S. PATENT DOCUMENTS 7,286,802 B2 * 10/2007 Beyme et al. .............. 455/67.14
2003/0236089 A1 12/2003 Beyme et al.
2008/0147370 A1 * 6/2008 Sjerling ......................... 703/13
(Continued)

FOREIGN PATENT DOCUMENTS

EP  2 237 594 A1  10/2010
WO  WO 02/067471 A1  8/2002

OTHER PUBLICATIONS

Picol, Sylvie, et al., "Further Steps Towards the Development of a Hardware Simulator for MIMO Radio Channels," 2005 IEEE 16$^{th}$ International Symposium on Personal, Indoor and Mobile Radio Communications, Jan. 1, 2005, XP031099806, pp. 557-561.
(Continued)

*Primary Examiner* — Kwang B Yao
*Assistant Examiner* — Syed M Bokhari
(74) *Attorney, Agent, or Firm* — Blakely, Sokoloff, Taylor & Zafman LLP

(57) ABSTRACT

A mobile terminal simulator for a wireless telecommunications network includes: a simulation engine, providing a bit stream, according to a communications standard; a conversion stage, which converts the bit stream into a baseband signal in the frequency domain; a mapping and transformation stage, which generates transmission samples in the time domain as a function of the baseband signal; and a transmission module, connectable to a Base Radio Station of a wireless telecommunications network by a communication port. A transmission channel simulator module is connected between the conversion stage and the mapping and transformation stage and processes the baseband signal in the frequency domain so as to simulate a transmission channel between the communication port and the Base Radio Station.

20 Claims, 6 Drawing Sheets

(56) References Cited

U.S. PATENT DOCUMENTS

2009/0094492 A1* 4/2009 Music et al. .................. 714/715
2009/0131044 A1* 5/2009 Marini et al. ................. 455/424

OTHER PUBLICATIONS

Eslami, Hamid, et al. "A Scalable Wireless Channel Emulator for Broadband MIMO Systems," Proceedings of the 2007 IEEE International Conference on Communications (ICC 2007), Jun. 1, 2007, Glasgow, UK, IEEE, Piscataway, NJ, USA, XP031126062, ISBN: 978-1-4244-0353-0, pp. 2592-2597.

European Search Report, Application No. EP 11 42 5130, Sep. 7, 2011, 2 pages.

* cited by examiner

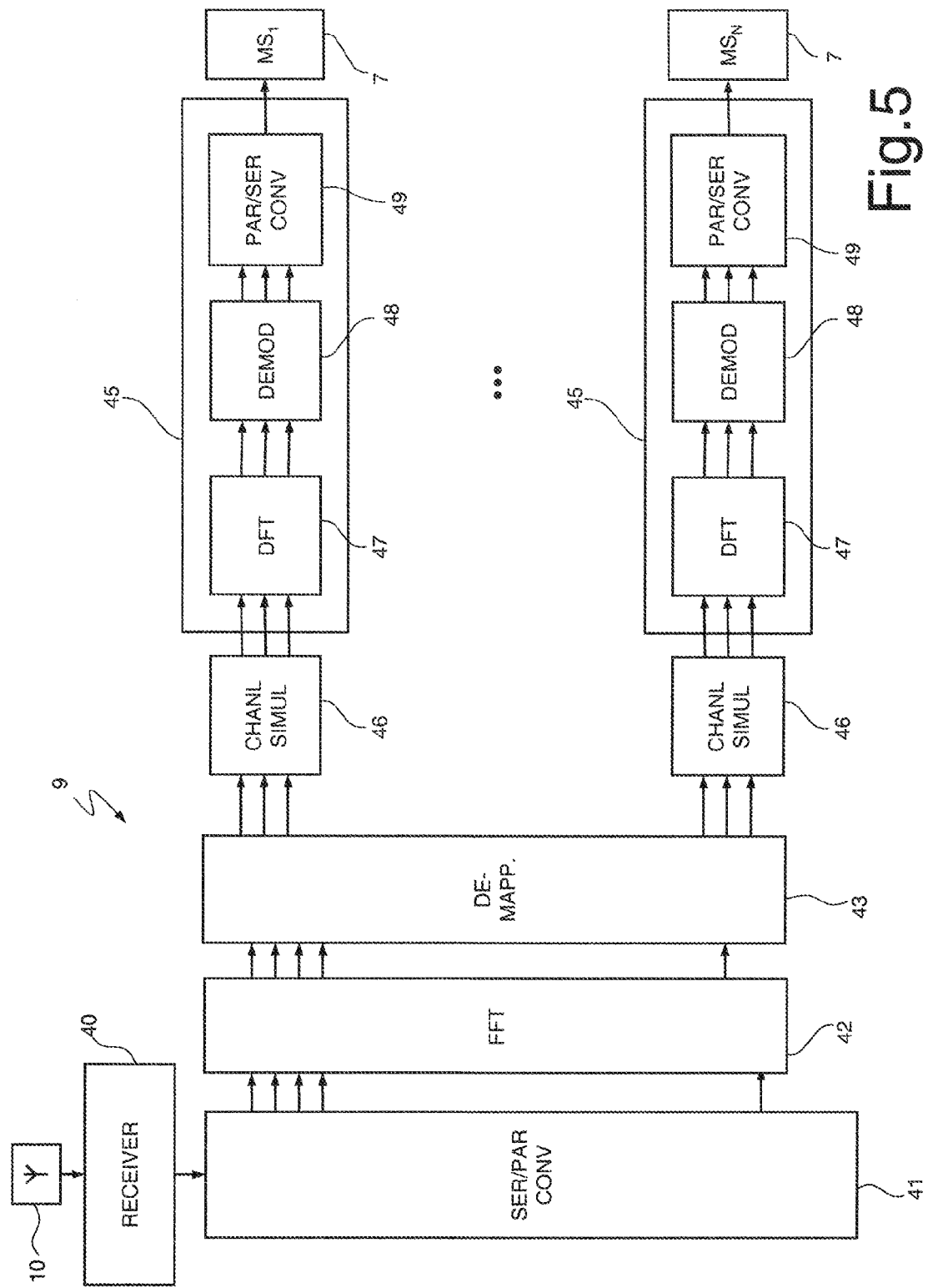

MOBILE TERMINAL SIMULATOR FOR A WIRELESS TELECOMMUNICATIONS NETWORK AND METHOD OF SIMULATING A MOBILE TERMINAL

FIELD OF INVENTION

The present invention relates to a mobile terminal simulator for a wireless telecommunications network and a method of simulating a mobile terminal.

BACKGROUND OF THE INVENTION

As is known, wireless telecommunications systems comprise a network infrastructure and mobile terminals. The network infrastructure generally comprises one or more interconnected operation centres and Base Radio Stations, which are organised to ensure coverage for a given area of territory and communicate with a respective operation centre. The mobile terminals connect to the network infrastructure through or more Base Radio Stations and can, for example, include mobile phones, notebook computers or palmtops with radio frequency link functions and the like.

The network infrastructure requires testing in order to check correct operation. Tests on the entire network infrastructure or on part of it can become necessary for various reasons. For example, in the design and implementation phases, it might be necessary to check the functionality of the Base Radio Station when linked to one or more terminals, the behaviour of which can be modified for the purpose of simulating fault situations or communications protocol errors. In addition, it might be necessary to check the expected behaviour of the base radio station in the presence of network loads caused by a number of simultaneously active user terminals.

To this end, test simulators are usually employed that, in practice, allow simulating the link to the network infrastructure and its utilization by one or more mobile terminals. In this way, it is possible to subject the network infrastructure or a part thereof to set operating conditions and assess the response of the entire system according to certain parameters.

A fundamental, yet at the same time very problematic aspect in the design and implementation of tests for communication systems is the possibility of accurately modelling the transmission channel, i.e. of correctly taking into consideration the effects of the transmission medium and phenomena that affect the signal between the transmission point and the reception point. One of the main problems in mobile radio communication systems derives from the fact that the mobile terminals are often in movement and therefore the properties of the radio channel change quickly. In fact, the pulse and attenuation response characteristics of the radio channel can even change thousands of times a second with wide variations in both phase and amplitude.

The properties of the radio channel and its transfer function, characterized in terms of phase and amplitude time changes as a function of time, are determined from the combination of two phenomena. A first phenomenon is linked to the presence of multipath fading, or rather to the fact that mobile terminals receive the signals transmitted from the base radio stations both directly and via reflections and therefore with different phase relations. A second phenomenon is linked to the Doppler Effect, which occurs when the mobile terminal is in movement with respect to the base radio station.

The disturbances on the radio channel are added to the effective signal, which represents transmitted sequences of symbols, and therefore renders decoding of the received message more difficult, with the possibility of introducing errors and therefore of invalidating the reception of data blocks.

To check the effects of the radio channel, channel simulators are used that process the test sequences generated by the mobile terminal simulators. To this end, the channel simulators use reference models to apply the effects due to the most common phenomena, for example, such as selective attenuations in the time and frequency domains due to the addition of a same reflected signal and interference signals originating from multipath fading.

The radio channel simulation devices currently in use have an input port and an output port and have a transfer function similar to that of a real transmission channel. A mobile terminal (or a mobile terminal simulator) is connected to the first port and a Base Radio Station is connected to the second port by means of appropriate radio frequency links.

An important limitation of known radio channel simulator devices is constituted by the possibility of only simulating one radio channel at a time. Instead, in a communication network under real conditions of use, several mobile terminals, with different movement profiles, can be simultaneously connected to the same Base Radio Station.

The complexity of telecommunications networks made using OFDM modulation, which is due both to the method of modulation and to the management of radio resources, requires verification and validation techniques based on the simulation of a radio environment with multiple, mutually independent mobile terminals. The most important functionality of a Base Radio Station increasingly resides in the management of radio resources, namely in the capacity to optimize the utilization of available bandwidth, minimizing interference and retransmission requests and maximizing achievable performance over a multiplicity of terminals. The most critical situations arise when users are distributed inside the area covered by the cell and especially in the so-called cell border area, the boundary area between adjacent cells. These situations require accurate tests under realistic conditions, which cannot be created using a sole conventional channel simulator for the entire population of terminals.

SUMMARY OF THE INVENTION

The object of the present invention is therefore to provide a mobile terminal simulator for a frequency-division multiple-access wireless telecommunications network and a method of simulating a mobile terminal of a frequency-division multiple-access wireless telecommunications network that enables the described limitations to be overcome.

In accordance with the present invention, there is provided a mobile terminal simulator for a frequency-division multiple-access wireless telecommunications network, comprising:

a simulation engine, configured to provide a bit stream, in accordance with a communications standard;

a conversion stage, configured to convert the bit stream into a baseband signal in the frequency domain;

a mapping and transformation stage, configured to generate a transmission sample stream in the time domain as a function of the baseband signal; and a transmission module, connectable to a Base Radio Station of a wireless telecommunications network by a communication port and configured to transmit the transmission sample stream in the time domain to the Base Radio Station;

characterized by a transmission channel simulator module connected between the conversion stage and the mapping and transformation stage and configured to process the baseband signal in the frequency domain and to provide a modified baseband signal so as to simulate the effect of a transmission channel between the communication port and the Base Radio Station.

In accordance with another aspect of the present invention, there is provided a method of simulating a mobile terminal of a frequency-division multiple-access wireless telecommunications network comprising:

providing a bit stream, in accordance with a communications standard;

converting the bit stream in the time domain into a baseband signal in the frequency domain;

transforming the baseband signal into a transmission sample stream (BST) in the time domain; and transmitting the transmission sample stream to a Base Radio Station of a frequency-division multiple-access wireless telecommunications network by a communication port;

characterized in that it comprises processing the baseband signal in the frequency domain and providing a modified baseband signal as a function of the baseband signal so as to simulate the effect of a transmission channel between the communication port and the Base Radio Station.

BRIEF DESCRIPTION OF THE DRAWINGS

The present invention will now be described with reference to the attached drawings, which illustrate some non-limitative embodiments, where:

FIG. 5 is a more detailed block diagram of a second link device incorporated in the simulator in FIG. 2;

DETAILED DESCRIPTION OF THE INVENTION

Figure 1:
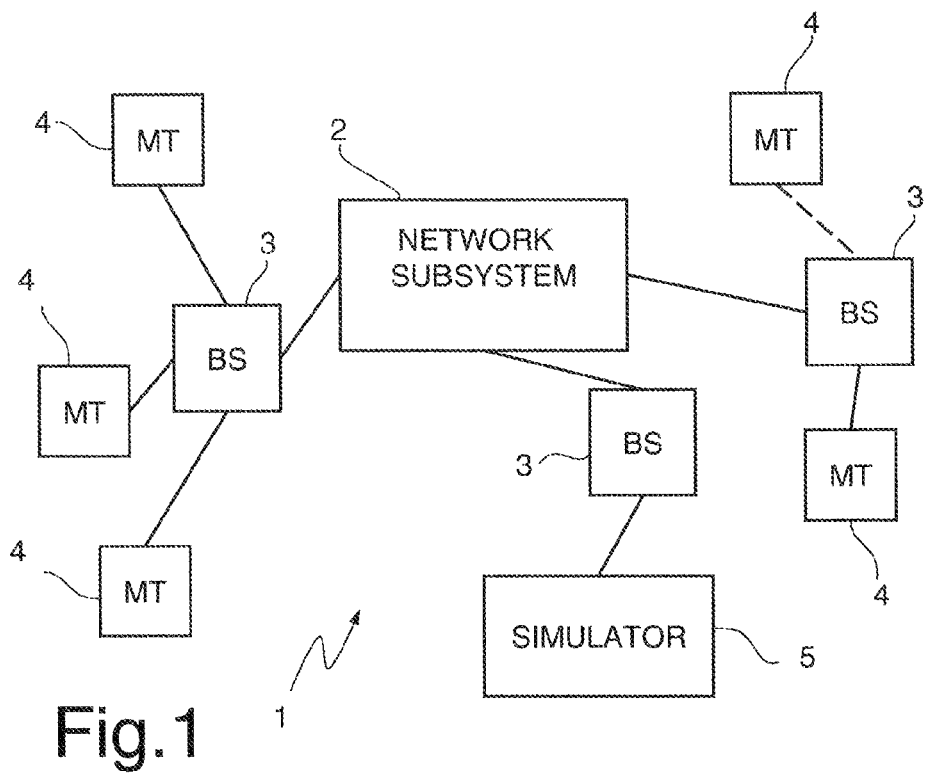
FIG. 1 is a simplified block diagram of a wireless telecommunications network.

FIG. 1 shows, in a simplified manner, a frequency-division multiple-access wireless telecommunications network based, for example, on OFDM (Orthogonal Frequency Division Multiplexing) or SC-FDMA (Single Carrier-Frequency Division Multiple Access) technology, which is indicated as a whole by reference numeral 1 and comprises a network subsystem 2, a plurality of Base Radio Stations 3 and a plurality of mobile terminals 4. Here and henceforth, the term "wireless telecommunications system" is intended as a telecommunications system in which at least the coupling between the mobile terminals and a network infrastructure is made by a radio frequency link.

In the example described here, the network infrastructure to which the mobile terminals 4 can be connected is defined by the network subsystem 2 and the Base Radio Stations 3 that are permanently connected to it. In particular, the mobile terminals 4 can activate a link via one of the Base Radio Stations 3, selected so as to optimize signal transmission and reception in accordance with the methods defined by the implemented standard. FIG. 1 also shows a channel simulator 5, connected on one side to one of the Base Radio Stations 3, for the purpose of carrying out functionality tests on the telecommunications system 1 or a part thereof.

In particular, the channel simulator 5 allows the simulation of a population of mobile terminals and the disturbance caused by the communication channel for each member of the population, under a plurality of different conditions.

Figure 2:
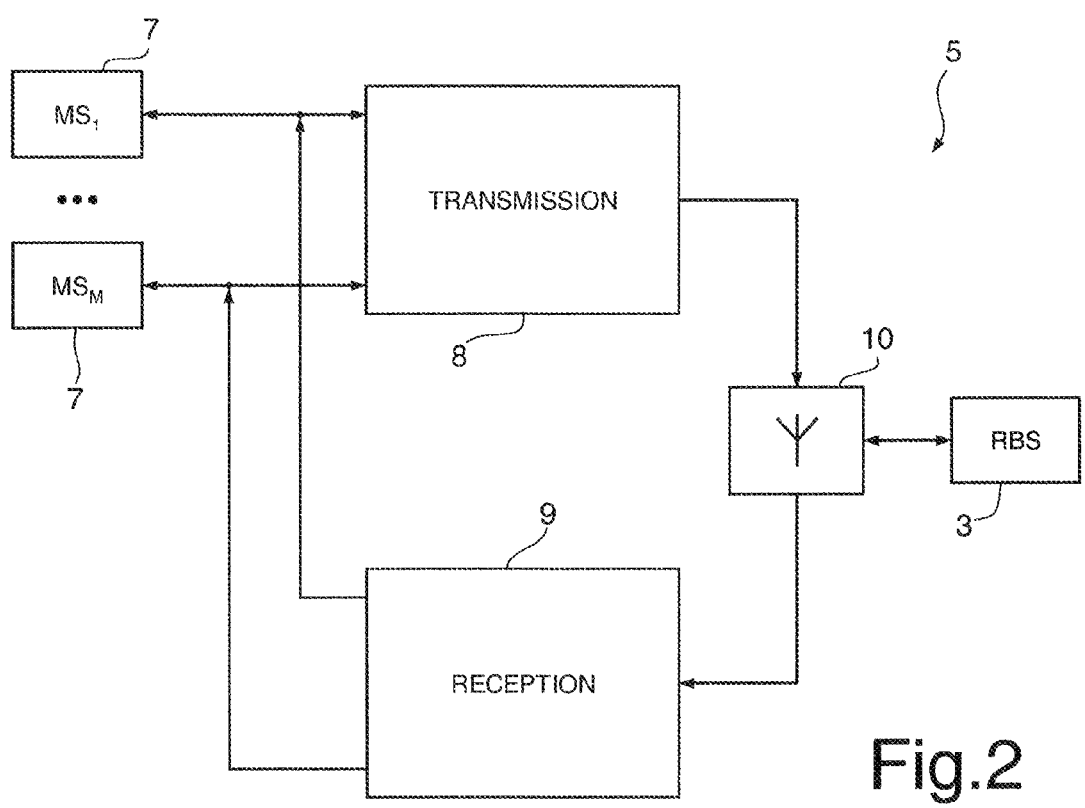
FIG. 2 is a simplified block diagram of a mobile terminal simulator for a frequency-division multiple-access wireless telecommunications network in accordance with a first embodiment of the present invention, utilizable in the wireless telecommunications network in FIG. 1.

As shown in FIG. 2, the channel simulator 5 comprises a plurality of simulation engines 7, an uplink device 8, a downlink device 9 and a communication port 10.

Figure 3:
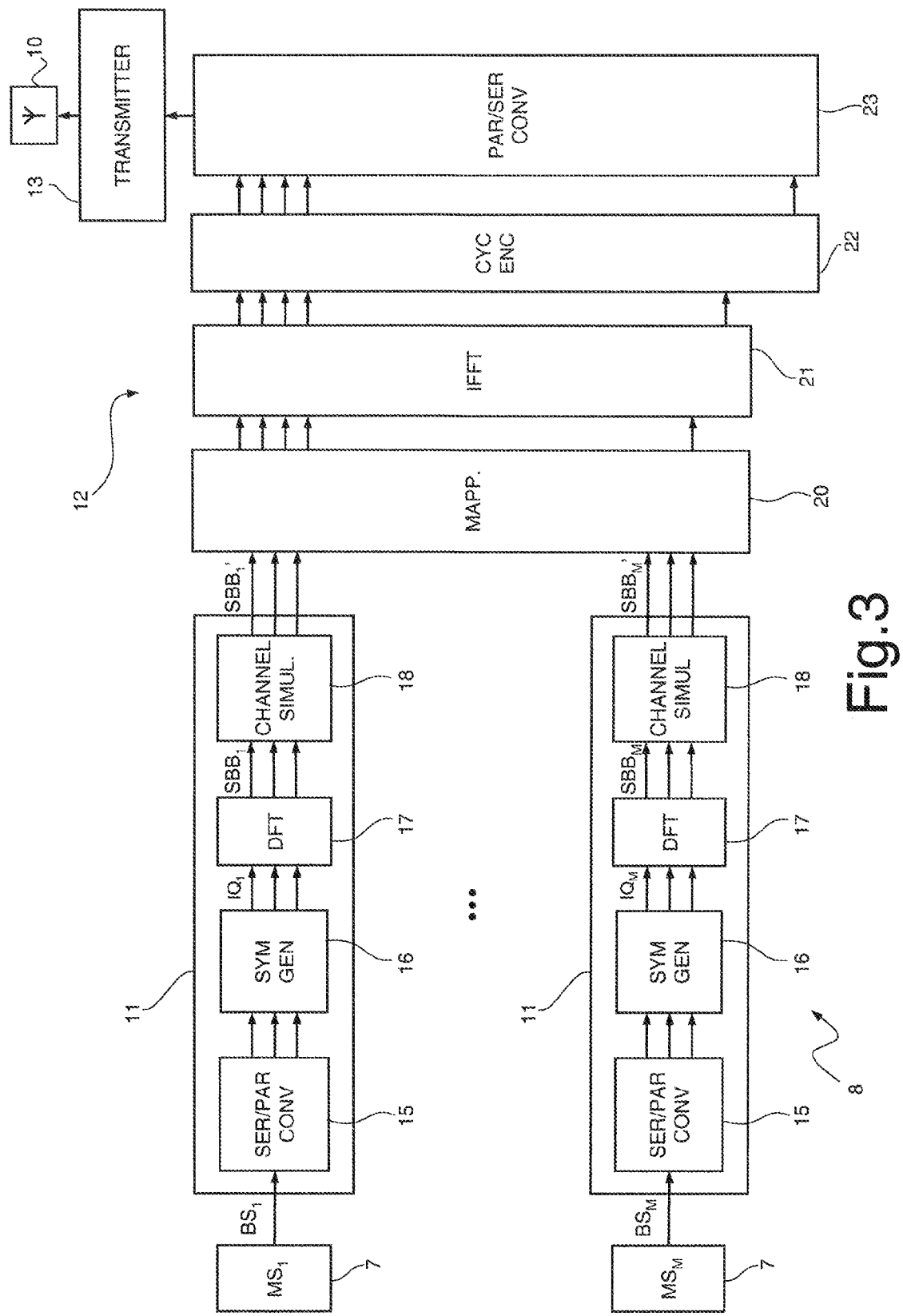
FIG. 3 is a more detailed block diagram of a first link device incorporated in the simulator in FIG. 2.

The structure of the uplink device 8 is shown in greater detail in FIG. 3. In particular, the uplink device 8 comprises a plurality of parallel-processing branches 11, a mapping and transformation stage 12 and a transmitter module 13.

The simulation engines 7 simulate the activity of mobile terminals through implementation of the protocol stacks of a communications standard. The simulation engines 7 are also configured to perform the typical functions of a mobile terminal, such as, for example, message recording, making a call and data transfer. Each simulation engine 7 provides a respective bit stream $BS_1, \ldots, BS_M$, comprising data sequences and control sequences in accordance with the implemented communications standard.

The parallel-processing branches 11 are connected to respective simulation engines 7 and each comprise a serial/parallel converter 15, a symbol generator module 16, a discrete Fourier transform module or DFT module 17 and a channel simulator module 18.

The serial/parallel converter 15 of each parallel-processing branch 11 receives a respective bit stream $BS_1, \ldots, BS_M$ in input and forms words each K bits long, in accordance with the modulation scheme employed (for example, BPSK, 16QAM or 64QAM). The words are passed to the symbol generator module 16 that, in a known manner, carries out constellation mapping (PSK or QAM) and in this way generates complex samples representative of the modulated bit stream. In practice, a constellation of $2^K$ complex points (symbols), each having amplitude and phase (or, in a equivalent manner, a real part and an imaginary part), is used to represent K bits to transmit on one of the subcarriers assigned by the Base Radio Station 3a to a given mobile terminal. A specific combination of the K bits is associated with each amplitude-phase (or real part-imaginary part) pair. The bit stream is encoded by means of sequences of amplitude-phase (or real part-imaginary part) value pairs corresponding to respective symbols of the constellation. Each assigned subcarrier is modulated in amplitude and phase, for a time interval, according to the symbol associated with a sequence of K bits to be transmitted.

The outputs of the symbol generator modules 16 therefore define the spectral content, in baseband, associated with each mobile terminal simulated by means of a simulation engine 7. In the following, the complex samples provided by the symbol generator modules 16 will be indicated as IQ samples. The symbol generator modules 16 therefore provide the respective sample sequences $IQ_1, \ldots, IQ_M$, with which the bit streams $BS_1, \ldots, BS_M$ provided by the simulation engines 7 are encoded. In particular, the samples $IQ_1, \ldots, IQ_M$, are a baseband representation of portions of the respective bit streams $BS_1, \ldots, BS_M$.

The DFT module 17 (which is only required in the case of SC-FDMA modulation) calculates the discrete Fourier transform on the set of samples $IQ_1, \ldots, IQ_M$. In practice, the output of the DFT module 17 provides a respective baseband signal $SBB_1, \ldots, SBB_M$ (for example, a generic baseband signal $SBB_I$) for a band assigned to the mobile terminal or, as in this case, to the coupled simulation engine 7. The DFT modules 17 have the effect of reducing the Peak-to-Average Power Ratio (PAPR). Each baseband signal $SBB_1, \ldots, SBB_M$ represents the amplitude and phase associated with a subcarrier assigned for a time interval.

In the case of OFDM modulation, the DFT module 17 is not present and the baseband signals $SBB_1, \ldots, SBB_M$ are directly represented by samples $IQ_1, \ldots, IQ_M$.

Thus, in the following, the term "baseband signals $SBB_1, \ldots, SBB_M$" is intended as the IQ samples modified by the DFT modules 17 in the case of SC-FDMA modulation and IQ samples in the case of OFDM modulation.

In practice, in each parallel-processing branch 11 the serial/parallel converter 15, the symbol generator module 16 and (in the case of SC-FDMA modulation) the DFT module 17 form a conversion stage that transforms the respective bit stream $BS_1, \ldots, BS_M$ into a corresponding baseband signal $SBB_1, \ldots, SBB_M$ in the frequency domain.

The channel simulator module 18 is based on a channel model in a respective condition. The channel simulator modules 18 of the various parallel-processing branches 11 implement respective conditions of distinct channels, corresponding to the number of sample situations (for example, the use of a mobile terminal in a stationary position in a closed environment, in movement on foot in a closed environment or in the open, on a slow and irregularly moving means of transport, on a rapid and substantially steady-speed means of transport and so forth). As is explained further on, the channel simulator module 18 operates on the respective baseband signal $SBB_I$ so as to simulate the effect of the communication channel between the Base Radio Station and a mobile terminal connected to it under certain conditions.

The channel simulator modules 18 provide respective modified baseband signals $SBB_1', \ldots, SBB_M'$.

The mapping and transformation stage 12 comprises a mapping module 20, an inverse Fourier transform module or IFFT module 21, an encoding module 22 and a parallel/serial converter 23.

The mapping module 20 receives the outputs of the channel simulator modules 18 of the parallel-processing branches 11 and performs a mapping of the modified baseband signals $SBB_1', \ldots, SBB_M'$ in input, assigning a subcarrier to each one of them for modulation. The law of correspondence between the input and output of the mapping module 20 is set by the radio resource manager of the Base Radio Station 3, which selects and communicates to each mobile terminal which bands and which subcarriers will be used for each time interval. In practice, the mapping module 20 works like a multiplexer controlled by the settings provided by the Base Radio Station 3. A translation on the outputs of the mapping module 20 (and therefore on the inputs of the IFFT module 21) is the equivalent to a frequency translation of the band assigned to a mobile terminal (simulated here by a simulation engine 7).

The IFFT module 21 performs an inverse Fourier transform and takes the processing from the frequency domain to the time domain.

The encoding module 22 introduces a cyclic prefix into the signal, for the purpose of minimizing inter-symbol interference.

The serial/parallel converter 23 converts the signals received from the encoding module 22 into a transmission sample stream BST, which is fed to the transmitter module 13.

The transmitter module 13, which is connected to the Base Radio Station 3 through the communication port 10, performs a digital-analogue conversion, filtering operations and conversion of the signals provided by the serial/parallel converter 23 for the frequency band utilized by the Base Radio Station 3.

In one embodiment, the communication port 10 is a connector that can be cable-connected to the Base Radio Station 3. Alternatively, the link to the Base Radio Station 3 can be wireless. In this case, the communication port 10 includes an antenna. The link to the Base Radio Station 3 can also be effected directly in baseband, without the need for frequency conversion.

Figure 4:
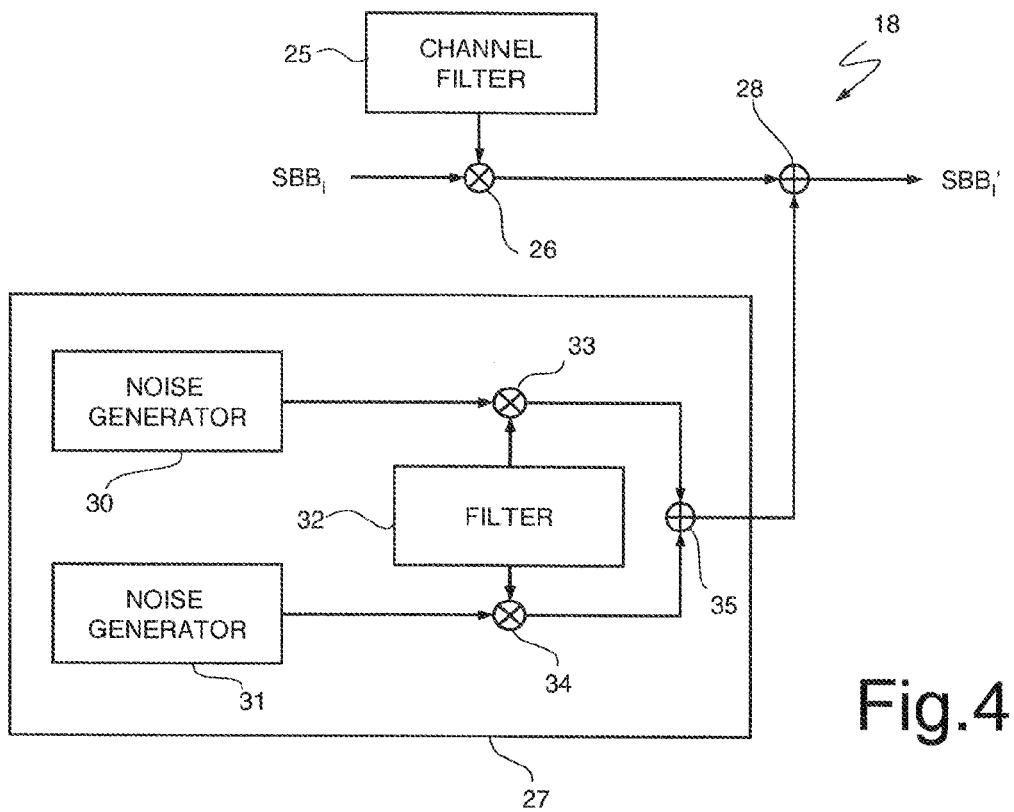
FIG. 4 is a more detailed block diagram of a component of the first link device in FIG. 3.

FIG. 4 shows the structure of the channel simulator module of one of the parallel-processing branches 11. It is understood that the channel simulator modules 18 of the other parallel-processing branches 11 have an identical structure and can be distinguished by the communication channel model that is implemented.

The channel simulator module 18 comprises a channel filter 25, a multiplier node 26, a complex noise generator 27 and an adder node 28.

The channel filter 25 implements a model of a type of communication channel, by means of a time-variant transfer function identified by a set of time-varying coefficients (for example, gain, poles and zeroes). For example, the transfer functions are characterized so as to simulate the use of a mobile terminal in a stationary position in a closed environment, in movement on foot in a closed environment or in the open, on a slow and irregularly moving means of transport, on a rapid and substantially steady-speed means of transport and so forth. In one embodiment, the channel filter 25 can be programmed to implement various transfer functions, each corresponding to a respective type of communication channel. In this case, the channel filter 25 is equipped with a memory element where various sets of coefficients are stored that identify corresponding transfer functions and which are selected each time according to the test to be performed.

The multiplier node 26 receives the respective baseband signal $SBB_I$ for the assigned subcarrier from the processing modules upstream of the channel simulator module 18 and, in addition, receives the set of coefficients that define the transfer function of the channel filter 25. The baseband signal $SBB_I$ for the assigned subcarrier and the transfer function are multiplied, which is the equivalent to calculating the convolution in the time domain.

The complex noise generator 27 comprises a first and a second random number generator 30 and 31 and a filter 32. The first and second random number generators 30 and 31 provide random numbers in an independent manner, respectively for the real part and the imaginary part of the noise. The filter 32 is applied to the outputs of both random number generators 30 and through convolution in the frequency domain (first and second multiplier nodes 33 and 34) and takes into account the fact that the spectral density of the noise cannot be considered perfectly uniform throughout the domain. The real part and the imaginary part of the noise are then added by an adder node 35.

The adder node 28 combines the baseband signal and the noise provided by the complex noise generator 27 by addition. The output of the adder node thus provides a baseband signal in the frequency domain that takes into account the influence of the communication channel on the signals coming from the mobile terminals (in this case, from the mobile terminal simulators 6).

The downlink device 9, shown in FIG. 5, is substantially symmetrical to the uplink device 8.

In the described embodiment, the downlink device 9 comprises a receiver module 40 that receives the signals coming from the Base Radio Station 3 through the communication port 10 and forms a sequence of samples in the time domain, a serial/parallel converter 41, an FFT module 42, a demapping module 43 and a plurality of parallel-processing branches 45, each one coupled to a respective simulation engine 7. The serial/parallel converter 41, the FFT module 42 and the demapping module 43 form a conversion and demapping stage 44.

The receiver module 40 performs the conversion from radio frequency to baseband and the analogue-digital conversion of the signals received.

The sample stream processed by the receiver module 40 is passed to the serial/parallel converter 41, which removes the cyclic prefixes and feeds the FFT module 42.

The demapping module 43 receives the outputs of the FFT module and provides baseband signals $SBB_K$ to the parallel-processing branches 45, according to the assignments set by the Base Radio Station 3.

The parallel-processing branches 45 are coupled to respective simulation engines 7 and each one comprises a channel simulator module 46, which receives a respective symbol sequence from the demapping module 43, a DFT module 47, a demodulator 48 and a parallel/serial converter 49.

In each parallel-processing branch 45, the channel simulator module 46 has substantially the same structure and works in the same way as the channel simulator modules 18 of the uplink device 8. The parallel/serial converter 49 converts demodulated samples into bit sequences, which are passed to the respective simulation engines 7.

In particular (FIG. 6), each channel simulator module 46 comprises a channel filter 50, a multiplier node 51, a complex noise generator 52 and an adder node 53.

The channel filter 50 implements a model of a type of communication channel, by means of a time-variant transfer function identified by a set of time-varying coefficients (for example, gain, poles and zeroes).

The multiplier node 51 receives a respective baseband signal $SBB_K$ for the assigned subcarrier from the demapping module 43 and, in addition, receives the set of coefficients that define the transfer function of the channel filter 50. The baseband signal for the assigned subcarrier and the transfer function are multiplied, which is the equivalent to calculating the convolution in the time domain.

The complex noise generator 52 comprises a first and a second random number generator 55 and 56 and a filter 57. The first and second random number generators 55 and 56 provide random numbers in an independent manner, respectively for the real part and the imaginary part of the noise. The filter 57 is applied to the outputs of both random number generators 55 and through convolution in the frequency domain (first and second multiplier node 58 and 59) and takes into account the fact that the spectral density of the noise cannot be considered perfectly uniform throughout the domain. The real part and the imaginary part of the noise are then added by an adder node 60.

The adder node 53 combines the baseband signal $SBB_K$ and the noise provided by the complex noise generator 27 by addition. The output of the adder node thus provides a modified baseband signal $SBB_K'$ in the frequency domain that takes into account the influence of the communication channel on the signals coming from the Base Radio Station 3.

The utilization of a channel simulator module 18 in each parallel-processing branch 11 enables working on narrow-band signals, corresponding to one or more subcarriers assigned by the Base Radio Station 3 to the mobile terminals simulated by each simulation engine 7. Furthermore, the effect of the communication channel is determined directly in the frequency domain, by multiplication of the transfer function of the channel filter 25 and the baseband signal for the assigned subcarriers. Multiplication in the frequency domain is the equivalent of a convolution operation in the time domain, but requires much less processing power. Reciprocally, the same effect can be obtained in reception by means of the channel simulator modules 46. It is therefore possible to simulate, by means of time-varying transfer functions, the effect of the communication channel simultaneously in a plurality of realistic situations. The simulation requires modest utilization of resources, as the computational load is not high, on one hand due to the limited bandwidth associated with the single subcarriers and on the other because the convolution in the frequency domain is resolved using multiplication operations.

The interference effects that can derive from adjacent cells or the noise of the receiver itself are simulated by selectively adding white noise to the signal coming from each simulation engine 7. The introduction of additive white noise is carried out on the baseband signal in the frequency domain.

Figure 7:
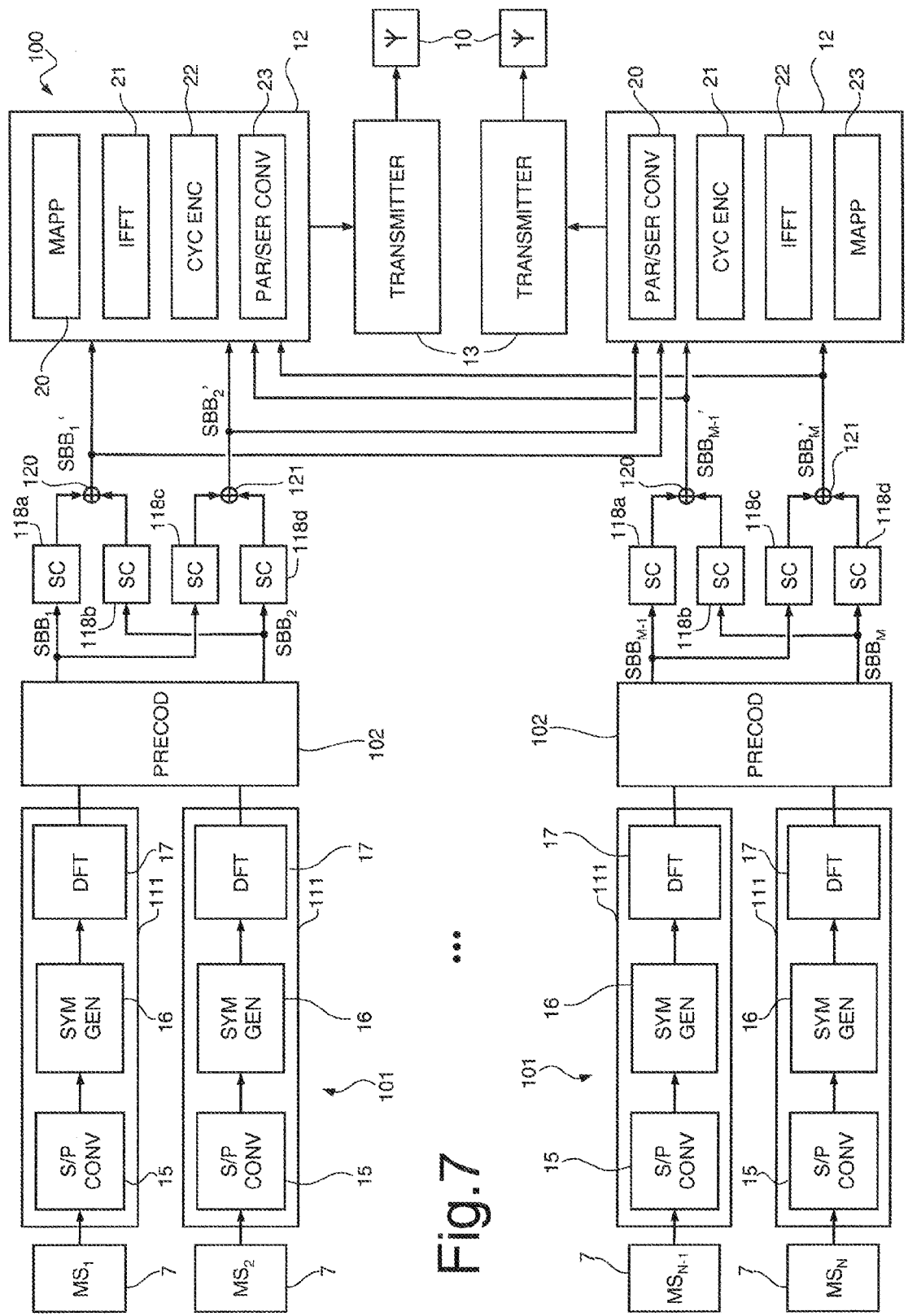
FIG. 7 is a first simplified block diagram regarding a mobile terminal simulator for a frequency-division wireless telecommunications network in accordance with a second embodiment of the present invention, utilizable in the wireless telecommunications network in FIG. 1.

According to the embodiment shown in FIG. 7, where parts the same as those already described are indicated with the same reference numerals, a channel simulator 100 of the MIMO ("Multiple Input Multiple Output) type comprises a plurality of simulation engines 7, a plurality of parallel-processing branches 111, each one coupled to a respective simulation engine 7, two mapping and transformation stages 12, two transmitter modules 13 and two communication ports 10.

The simulation engines 7 and the respective parallel-processing branches 111 are associated in pairs that share the same resources in terms of subcarriers and band allocated by the Base Radio Station. Pairs of simulation engines 7 and the respective associated parallel-processing branches 111 form the simulation units 101.

In particular, each of the parallel-processing branches 111 includes a respective serial/parallel converter 15, a respective symbol generator module 16 and a respective DFT module 17 of the type already described.

In one embodiment, each simulation unit 101 comprises a MIMO precoding matrix 102, which receives the outputs of the respective parallel-processing branches 111 and processes them to optimize the transmission. In particular, the simulation units 101 have respective first and second outputs, defined by respective first and second outputs of the MIMO precoding matrices 102 and providing respective baseband signals $SBB_1, \ldots, SBB_M$.

Furthermore, four independent channel simulator modules 118a, 118b, 118c and 118d, of the type described with reference to FIG. 4, are associated with each simulation unit 101. In general, if K communication ports are present, the number of simulation modules is $2^K$.

For simplicity, reference will henceforth be made to a single simulation unit 101. However, it is understood that what is described is also applicable to all the other simulation units 101, except where specified otherwise.

The first output of the precoding matrix 102 is connected to channel simulator modules 118a and 118c, while the second output is connected to channel simulator modules 118b and 118d. The outputs of channel simulator modules 118a and 118b are added by adder node 120 and the outputs of channel simulator modules 118c and 118d are added by adder node 121. The outputs of adder nodes 120 and 121 provide respective modified baseband signals $SBB_1', \ldots, SBB_M'$, which are forwarded in parallel to both of the mapping and transformation stages 12. In this way, in practice, the effects of the communication channel along the paths between each of the two communication ports 10 of the channel simulator 100 and the two corresponding input ports of the Base Radio Station 3 to which the channel simulator 100 is coupled (in practice, four paths) are taken into consideration independently. The mutual contributions of the two lines of each simulation unit 101 are combined by addition.

The mapping and transformation stages 12 have the same structure already described with reference to FIG. 3 and, in particular, each comprise a respective instance of the mapping module 20, the inverse transform module or IFFT module 21, the encoding module 22 and the parallel/serial converter 23.

The transmission sample streams $BST_1$ and $BST_2$ produced by the two parallel/serial converters 23 are fed to the respective transmitter modules 13, which are each connected to the Base Radio Station 3 through a respective communication port 10. As in the case of FIG. 3, the transmitter modules 13 perform digital-analogue conversion, filtering operations and conversion of the analogue signal to the frequency band used by the Base Radio Station 3.

Finally, the transmission sample streams $BST_1$ and $BST_2$ are transmitted separately and simultaneously to the Base Radio Station 3 by the transmitter modules 13.

Figure 8:
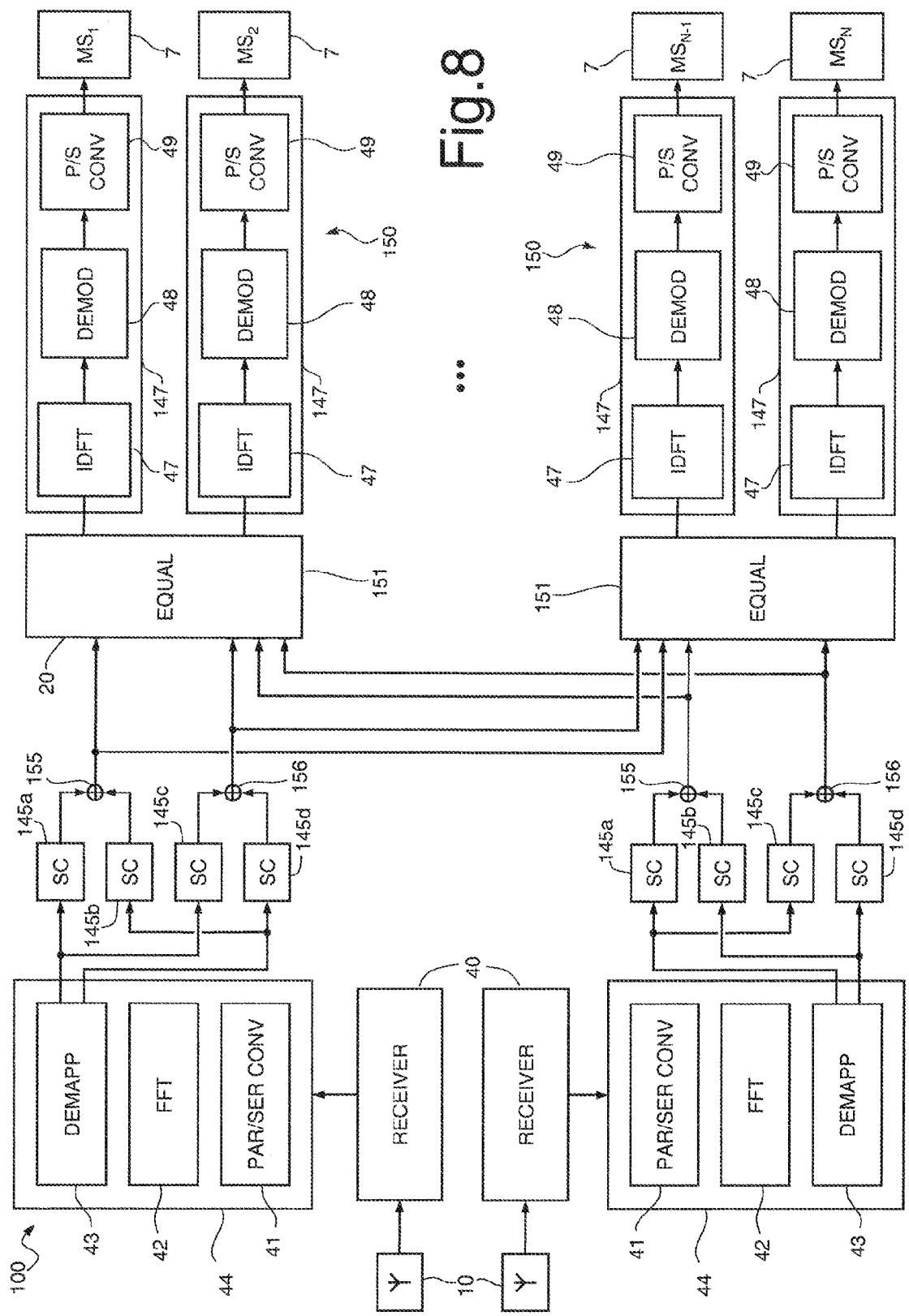
FIG. 8 is a second simplified block diagram regarding a mobile terminal simulator for a frequency-division wireless telecommunications network in accordance with the second embodiment of the present invention.

FIG. 8 schematically shows the reception system on the MIMO channel simulator 100 in FIG. 7.

The reception system comprises two receiver modules 40, coupled to respective communication ports 10, two conversion and demapping stages 144 and a plurality of parallel-processing branches 147, each one coupled to a respective simulation engine 7.

The simulation engines 7 and the respective parallel-processing branches 147 are associated in pairs that share the same resources in terms of subcarriers and band allocated by the Base Radio Station. Pairs of simulation engines 7 and the respective associated parallel-processing branches 147 form the simulation units 150, each of which also comprises a respective equalization stage 151.

Figure 6:
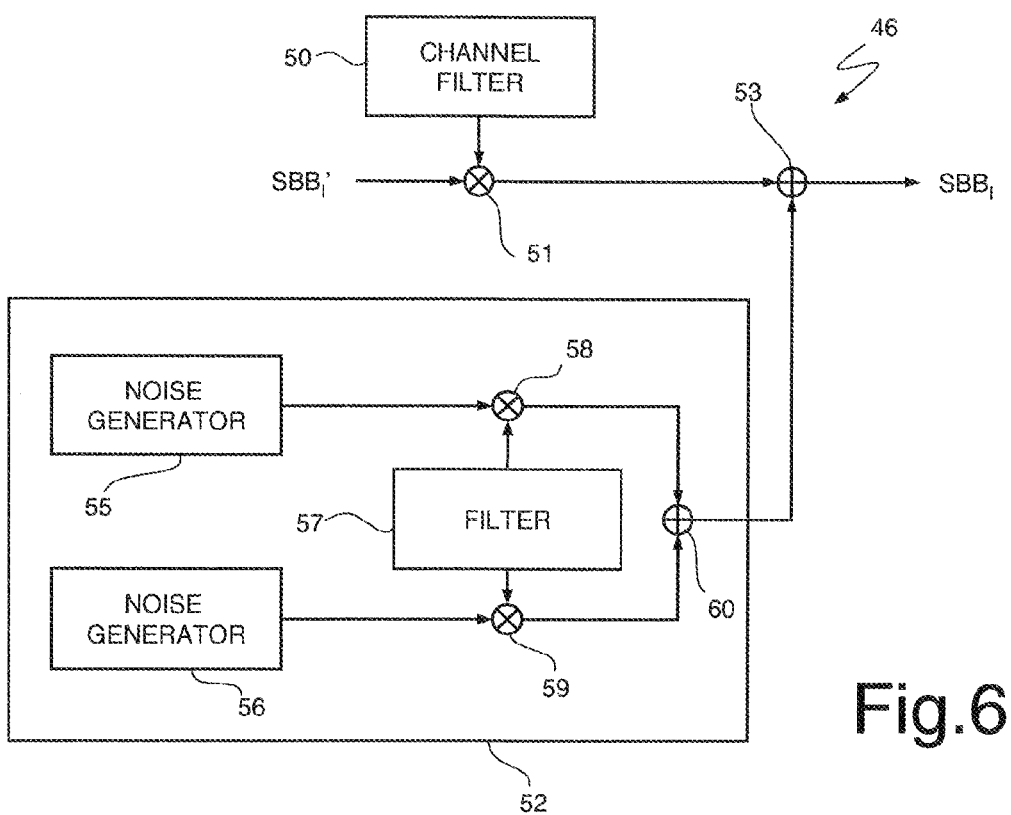
FIG. 6 is a more detailed block diagram of a third link device incorporated in the simulator in FIG. 2.

Furthermore, four independent simulation modules 145a, 145b, 145c and 145d, of the type described with reference to FIG. 6, are associated with each simulation unit 147 (in general, $2^K$ simulation modules, where K is the number of communication ports 10).

The conversion and demapping stages 144 each comprise a serial/parallel converter 41, an FFT module 42 and a demapping module 43.

The receiver modules 40 perform the conversion from radio frequency to baseband and the analogue-digital conversion of the signals received through the respective communication ports 10.

The sample streams processed by the receiver modules 40 are passed to the respective serial/parallel converters 41, which remove the cyclic prefixes and feed the respective FFT modules 42.

The demapping modules 43 receive the outputs of the respective FFT modules 42 and provide baseband signals in the frequency domain, which are processed by the channel simulator modules 145a-145d and then combined, prior to being fed to the parallel-processing branches 145, according to the assignments set by the Base Radio Station 3.

For simplicity, reference will henceforth be made to a single simulation unit 150. However, it is understood that what is described is also applicable to all the other simulation units 150, except where specified otherwise.

The channel simulator modules 145a and 145c associated with the simulation unit 150 receive the same output from a first of the demapping modules 43, while channel simulator modules 145b and 145d receive the same output from a second of the demapping modules 43. The outputs of channel simulator modules 145a and 145b are added by an adder node 155 and the outputs of channel simulator modules 145c and 145d are added by an adder node 156. The outputs of adder nodes 155 and 156 are forwarded in parallel to respective inputs of a same simulation unit 150. In this way, in practice, the effects of the communication channel along the paths between each of the two communication ports 10 of the channel simulator 100 and the two corresponding input ports of the Base Radio Station 3 to which the channel simulator 100 is coupled (in practice, four paths) are taken into consideration independently. The mutual contributions of the two lines of each simulation unit 101 are combined by addition.

As mentioned, each simulation unit 150 comprises an equalization stage 151 and two parallel-processing branches 147. The inputs of the equalization stage 151 define the inputs of the corresponding simulation unit 150. The equalization stages 151 also have outputs coupled to respective parallel-processing branches 147 of the simulation unit 150 to which they belong.

Each one of the parallel-processing branches 147 includes an IDFT module 47, a demodulator 48 and a parallel/serial converter 49, as already described with reference to FIG. 5.

That which has been described is also applicable in the case of MIMO systems with more than two transmission paths (four for example).

Finally, it is clear that changes or modifications may be made to the mobile terminal simulator, without departing from the scope of the present invention, as defined in the appended claims.

What is claimed is:

1. A mobile terminal simulator for a frequency-division multiple-access wireless telecommunications network, comprising:
    a plurality of simulation engines, each configured to provide a respective independent bit stream, in accordance with a communications standard;
    a plurality of parallel-processing branches in transmission, each one coupled to a respective simulation engine, to receive the respective bit stream;
    wherein each parallel-processing branch in transmission comprises:
    a respective conversion stage, coupled to a respective simulation engine, configured to convert the respective bit stream in the time domain into a respective baseband signal in the frequency domain;
    a mapping and transformation stage, configured to generate a respective transmission sample stream (BST) in the time domain as a function of the respective baseband signal; and
    a transmission module, connectable to a Base Radio Station of a wireless telecommunications network by a communication port and configured to transmit the respective transmission sample stream in the time domain to the Base Radio Station,
    wherein a respective transmission channel simulator module is connected between the respective conversion stage and the mapping and transformation stage and is configured to process the respective baseband signal in the frequency domain and to provide a respective modified baseband signal to the mapping and transformation stage so as to simulate the effect of a respective transmission channel between the respective simulation engine and the Base Radio Station, and wherein the mapping and transformation stage comprises a mapping module, coupled to the respective transmission channel simulator modules to receive the modified baseband signals and configured to carry out a mapping of the modified baseband signals, assigning at least one respective subcarrier to each modified baseband signal.

2. A simulator according to claim 1, wherein at least one of the transmission channel simulator modules is configured to apply a channel transfer function, representative of the effect of the transmission channel between the communication port and the Base Radio Station, to the baseband signal.

3. A simulator according to claim 2, wherein at least one of the transmission channel simulator modules is configured to multiply, in the frequency domain, the baseband signal by the channel transfer function.

4. A simulator according to claim 2, wherein at least one of the channel simulator modules is configured to apply additive noise.

5. A simulator according to claim 4, wherein at least one of the transmission channel simulator modules comprises a complex noise generator and an adder node-configured to add the additive noise provided by the complex noise generator to the baseband signal.

6. A simulator according to claim 5, wherein the complex noise generator comprises a first and a second random number generator and a filter applied to the outputs of both random number generators.

7. A simulator according to claim 1, comprising a plurality of mapping and transformation stages and a plurality of transmission modules; wherein:
    groups of simulation engines and respective transmission parallel-processing branches form transmission simulation units;
    each transmission simulation unit comprises a respective MIMO precoding matrix, having the same number of outputs as the number of transmission parallel-processing branches in the simulation unit; and
    a respective receive-channel simulator module is arranged between each output of each MIMO precoding matrix and each mapping and transformation stage.

8. A simulator according to claim 7, wherein adder nodes are associated with each transmission simulation unit and are configured to add the outputs of receive-channel simulator modules coupled to distinct outputs of the respective MIMO precoding matrix.

9. A simulator according to claim 8, wherein the outputs of receive-channel simulator modules coupled to a same MIMO precoding matrix output are supplied to distinct adder nodes.

10. A simulator according to claim 7, wherein the adder nodes are configured to feed respective outputs in parallel to each mapping and transformation stage.

11. A mobile terminal simulator for a frequency-division multiple-access wireless telecommunications network, comprising:
    a plurality of simulation engines, each configured to provide a respective independent bit stream, in accordance with a communications standard;
    a plurality of parallel-processing branches in transmission, each one coupled to a respective simulation engine, to receive the respective bit stream;
    wherein each parallel-processing branch in transmission comprises:
        a respective conversion stage, coupled to a respective simulation engine, configured to convert the respective bit stream in the time domain into a respective baseband signal in the frequency domain;
        a mapping and transformation stage, configured to generate a respective transmission sample stream (BST) in the time domain as a function of the respective baseband signal; and
        a transmission module, connectable to a Base Radio Station of a wireless telecommunications network by a communication port and configured to transmit the respective transmission sample stream in the time domain to the Base Radio Station,
    wherein a respective transmission channel simulator module is connected between the respective conversion stage and the mapping and transformation stage and is configured to process the respective baseband signal in the frequency domain and to provide a respective modified baseband signal to the mapping and transformation stage so as to simulate the effect of a respective transmission channel between the respective simulation engine and the Base Radio Station, and
    wherein the mapping and transformation stage comprises:
        a mapping module, coupled to the respective transmission channel simulator modules to receive the modified baseband signals and configured to carry out a mapping of the modified baseband signals, assigning at least one respective subcarrier to each modified baseband signal;
        an inverse transform module, coupled to the mapping module and configured to perform an inverse transform on the modified baseband signals;
        an encoding module, configured to introduce cyclic prefixes into the signals received from the inverse transform module; and
        a serial/parallel converter, configured to convert signals received from the encoding module in the transmission sample stream and to feed the transmission sample stream to the transmitter module.

12. A simulator according to claim 11, wherein at least one of the transmission channel simulator modules is configured to apply a channel transfer function, representative of the effect of the transmission channel between the communication port and the Base Radio Station, to the baseband signal.

13. A simulator according to claim 12, wherein at least one of the transmission channel simulator modules is configured to multiply, in the frequency domain, the baseband signal by the channel transfer function.

14. A simulator according to claim 12, wherein at least one of the channel simulator modules is configured to apply additive noise.

15. A simulator according to claim 14, wherein at least one of the transmission channel simulator modules comprises a complex noise generator and an adder node-configured to add the additive noise provided by the complex noise generator to the baseband signal.

16. A mobile terminal simulator for a frequency-division multiple-access wireless telecommunications network, comprising:
    a plurality of simulation engines, each configured to provide a respective independent bit stream, in accordance with a communications standard;
    a plurality of parallel-processing branches in transmission, each one coupled to a respective simulation engine, to receive the respective bit stream;
    wherein each parallel-processing branch in transmission comprises:

a respective conversion stage, coupled to a respective simulation engine, configured to convert the respective bit stream in the time domain into a respective baseband signal in the frequency domain;

a mapping and transformation stage, configured to generate a respective transmission sample stream (BST) in the time domain as a function of the respective baseband signal;

a transmission module, connectable to a Base Radio Station of a wireless telecommunications network by a communication port and configured to transmit the respective transmission sample stream in the time domain to the Base Radio Station, wherein:

a respective transmission channel simulator module is connected between the respective conversion stage and the mapping and transformation stage and is configured to process the respective baseband signal in the frequency domain and to provide a respective modified baseband signal to the mapping and transformation stage so as to simulate the effect of a respective transmission channel between the respective simulation engine and the Base Radio Station, and the mapping and transformation stage comprises a mapping module, coupled to the respective transmission channel simulator modules to receive the modified baseband signals and configured to carry out a mapping of the modified baseband signals, assigning at least one respective subcarrier to each modified baseband signal; and a plurality of reception modules, each connectable to the Base Radio Station to receive the respective transmission sample stream transmitted by the Base Radio Station;

a plurality of conversion and demapping stages, each configured to transform the received sample stream into a sample stream in the frequency domain;

a plurality of receive-channel simulator modules, wherein:
each receive-channel simulator module is connected between respective conversion and demapping stages and at least one demodulator, and
each receive-channel simulator module is configured to process the sample stream in the frequency domain so as to simulate the effect of a transmission channel between the simulation engine and the Base Radio Station; and a plurality of reception parallel-processing branches; wherein:
groups of simulation engines and respective reception parallel-processing branches form reception simulation units,
each reception simulation unit comprises a respective equalization stage, having outputs connected to respective reception parallel-processing branches, and
respective receive-channel simulator modules are arranged between each output of each conversion and demapping stage and each input of each equalization stage.

17. A simulator according to claim 16, wherein receiving adder nodes are associated with each reception simulation unit and configured to add the outputs of receive-channel simulator modules coupled to outputs of distinct conversion and demapping stages.

18. A simulator according to claim 17, wherein the receiving adder nodes are configured to feed respective outputs to respective reception parallel-processing branches.

19. A simulator according to claim 16, wherein at least one of the transmission channel simulator modules is configured to apply a channel transfer function, representative of the effect of the transmission channel between the communication port and the Base Radio Station, to the baseband signal.

20. A simulator according to claim 19, wherein at least one of the transmission channel simulator modules is configured to multiply, in the frequency domain, the baseband signal by the channel transfer function.

* * * * *